United States Patent
Yoon et al.

(10) Patent No.: US 8,201,141 B2
(45) Date of Patent: Jun. 12, 2012

(54) APPARATUS AND METHOD FOR CREATING CONTROL CODE FOR HOME NETWORK APPLIANCE ACCORDING TO RESOLUTION OF CONTROL DEVICE

(75) Inventors: Su-jeong Yoon, Seoul (KR); O-shik Kwon, Seongnam-si (KR); Kwan-woo Song, Yongin-si (KR); Sun-hyung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1485 days.

(21) Appl. No.: 11/311,395

(22) Filed: Dec. 20, 2005

(65) Prior Publication Data

US 2006/0156281 A1  Jul. 13, 2006

(30) Foreign Application Priority Data

Jan. 11, 2005  (KR) .................. 10-2005-0002588

(51) Int. Cl.
*G06F 9/44* (2006.01)
*G06F 9/45* (2006.01)
*G06F 17/22* (2006.01)
*G06F 3/00* (2006.01)

(52) U.S. Cl. ........ 717/106; 717/107; 717/136; 715/239; 715/740; 715/760

(58) Field of Classification Search .................. 715/200, 715/700; 700/1
See application file for complete search history.

(56) References Cited

U.S. PATENT DOCUMENTS 5,949,412 A * 9/1999 Huntsman .................. 715/740
(Continued)

FOREIGN PATENT DOCUMENTS

JP  2002-271361 A  9/2002
(Continued)

OTHER PUBLICATIONS

Nichols, J., et al., "Generating Remote Control Interfaces for Complex Appliances," Proceedings of the 15th annual ACM Symposium on User Interface Software and Technology [online], 2002 [retrieved Feb. 2, 2002], Retrieved from Internet:<http://dl.acm.org/citation.cfm?id=572008>, pp. 161-170.*

(Continued)

*Primary Examiner* — Thuy Dao
*Assistant Examiner* — Todd Aguilera
(74) *Attorney, Agent, or Firm* — Sughrue Mion, PLLC

(57) ABSTRACT

An apparatus and a method for creating a control code for a home network appliance according to resolution of a control device which can automatically create a control code for a home network appliance according to the resolution of the control device and can perform a testing of the device even in the case in which the home network appliance is not bound. The apparatus includes a first receiving unit to receive a first HTML file that provides a graphic user interface composed of fragmented images, a resource management unit to create a pseudo code that defines a matching relation between an image ID of the image and a behavior function for controlling the home network appliance or collecting a state of the home network appliance, a user interface (UI) code creating unit to create a second HTML file on which the matching relation is reflected with reference to the created pseudo code, and a script code creating unit to create a script code that is called by the second HTML file to control the home network appliance or collect the state of the home network appliance.

15 Claims, 6 Drawing Sheets

U.S. PATENT DOCUMENTS

| | | | |
|---|---|---|---|
| 6,023,714 | A | 2/2000 | Hill et al. |
| 6,157,940 | A * | 12/2000 | Marullo et al. ................. 703/27 |
| 6,188,401 | B1 * | 2/2001 | Peyer ............................ 715/805 |
| 6,230,157 | B1 * | 5/2001 | Malcolm et al. ............. 707/100 |
| 6,535,896 | B2 * | 3/2003 | Britton et al. ................. 715/239 |
| 6,546,419 | B1 | 4/2003 | Humpleman et al. |
| 6,587,125 | B1 * | 7/2003 | Paroz ............................ 715/740 |
| 6,717,593 | B1 * | 4/2004 | Jennings ....................... 715/760 |
| 6,735,619 | B1 * | 5/2004 | Sawada ......................... 709/212 |
| 6,919,792 | B1 * | 7/2005 | Battini et al. ................ 340/5.32 |
| 6,955,298 | B2 * | 10/2005 | Herle ....................... 235/472.01 |
| 7,010,365 | B2 * | 3/2006 | Maymudes ...................... 700/65 |
| 7,124,398 | B2 * | 10/2006 | Chen et al. .................... 717/106 |
| 7,362,381 | B1 * | 4/2008 | Stahl et al. .................... 348/569 |
| 7,441,196 | B2 * | 10/2008 | Gottfurcht et al. ............ 715/740 |
| 7,562,352 | B2 * | 7/2009 | Yamada et al. ............... 717/136 |
| 7,610,559 | B1 * | 10/2009 | Humpleman et al. ........ 715/762 |
| 7,739,414 | B2 * | 6/2010 | Yi et al. ........................ 709/250 |
| 7,747,980 | B2 * | 6/2010 | Illowsky et al. .............. 717/107 |
| 7,930,631 | B2 * | 4/2011 | Sahota et al. ................. 715/239 |
| 8,069,435 | B1 * | 11/2011 | Lai ................................ 717/106 |
| 2001/0034754 | A1 * | 10/2001 | Elwahab et al. .............. 709/201 |
| 2002/0035404 | A1 * | 3/2002 | Ficco et al. ...................... 700/65 |
| 2002/0122060 | A1 * | 9/2002 | Markel .......................... 345/760 |
| 2002/0154161 | A1 * | 10/2002 | Friedman et al. ............. 345/740 |
| 2002/0198964 | A1 * | 12/2002 | Fukazawa et al. ............ 709/219 |
| 2003/0037076 | A1 | 2/2003 | Bravery et al. |
| 2003/0106025 | A1 * | 6/2003 | Cho et al. ...................... 715/523 |
| 2003/0140279 | A1 * | 7/2003 | Szucs et al. ..................... 714/31 |
| 2004/0061713 | A1 | 4/2004 | Jennings |
| 2005/0039133 | A1 * | 2/2005 | Wells et al. ................... 715/740 |
| 2005/0091607 | A1 * | 4/2005 | Satou et al. ................... 715/788 |
| 2005/0097579 | A1 * | 5/2005 | Dorn et al. .................... 719/330 |
| 2005/0108633 | A1 * | 5/2005 | Sahota et al. ................. 715/513 |
| 2005/0114757 | A1 * | 5/2005 | Sahota et al. ............. 715/501.1 |
| 2005/0138606 | A1 * | 6/2005 | Basu et al. .................... 717/136 |
| 2005/0149501 | A1 * | 7/2005 | Barrett .............................. 707/3 |
| 2005/0172228 | A1 | 8/2005 | Kakuda |
| 2005/0172261 | A1 * | 8/2005 | Yuknewicz et al. ........... 717/106 |
| 2005/0289509 | A1 * | 12/2005 | Illowsky et al. .............. 717/107 |
| 2005/0289510 | A1 * | 12/2005 | Illowsky et al. .............. 717/107 |
| 2006/0130006 | A1 * | 6/2006 | Chitale ......................... 717/136 |
| 2006/0168526 | A1 * | 7/2006 | Stirbu ........................... 715/740 |
| 2006/0277479 | A1 * | 12/2006 | Britt et al. ..................... 715/760 |
| 2007/0288855 | A1 * | 12/2007 | Rohrabaugh et al. ......... 715/760 |

FOREIGN PATENT DOCUMENTS

| | | |
|---|---|---|
| JP | 2003-256455 A | 9/2003 |
| JP | 2004-235962 A | 8/2004 |
| KR | 2003-0016739 A | 3/2003 |
| KR | 10-2004-0071705 A | 8/2004 |

OTHER PUBLICATIONS

Luytenm K., "Runtime Transformations for Modal Independent User Interface Migration," Interacting with Computers [online], 2003 [retrieved Feb. 2, 2002], Retrieved from Internet: <http://www.sciencedirect.com/science/article/pii/S0953543803000122>, pp. 329-347.*

Omojokun, O., et al., "Experiments with Mobile Computing Middleware for Deploying Appliance UIs," Proceedings if the 23rd International Conference on Distributed Computing Systems Workshops [online], 2003 [retrieved Feb. 2, 2012], Retrieved from Internet: <http://ieeexplore.ieee.org/stamp/stamp.jsp?tp=&arnumber=1203582>, pp. 1-6.*

M. Honkala, et al., "A Device Independent XML User Agent for Multimedia Terminals", Multimedia Software Engineering, 2004. Proceedings. IEEE Sixth International Symposium on Miami, FL, USA, IEEE, Dec. 13, 2004, pp. 116-123, XP010757237.

Marc Abrams, et al., "UIML: An XML Language for Building Device-Independent User Interfaces", XML Conference Proceedings. Proceedings of XML, Dec. 1999, XP002161335.

* cited by examiner

APPARATUS AND METHOD FOR CREATING CONTROL CODE FOR HOME NETWORK APPLIANCE ACCORDING TO RESOLUTION OF CONTROL DEVICE

CROSS-REFERENCE TO RELATED APPLICATION

This application claims priority from Korean Patent Application No. 10-2005-0002588 filed on Jan. 11, 2005 in the Korean Intellectual Property Office, the disclosure of which is incorporated herein by reference in its entirety.

BACKGROUND OF THE INVENTION

1. Field of the invention

Apparatuses and methods consistent with the present invention relate to creating a control code for a home network appliance according to the resolution of a control device, and more particularly, to creating a control code for a home network appliance according to the resolution of a control device which can automatically create a control code for a home network appliance according to the resolution of a device for controlling the home network appliance or collecting a state of the home network appliance and can perform testing of the device for controlling the home network appliance or collecting the state of the home network appliance even in the case in which the home network appliance is not bound.

2. Description of the Prior Art

As the Internet, which has been limited to specified categories, is widely spread through web implementations, it has a great effect upon the entire field of digital industry. Internet-based services, and contents which are in circulation through the Internet, have become an index of the 21$^{st}$ century digital field. In addition, with the start of content circulation through multimedia such as high-speed Internet, portable phones, personal data assistants (PDAs), notebook computers, etc., multimedia are now necessary matters, and not simply optional.

Meanwhile, computer-based information communications have been changed into the concept of "ubiquitous." The word "ubiquitous" means "existing, found or seeming to be found everywhere at the same time", and indicates an information communication environment in which a user can freely access a network without being conscious of the network or computer irrespective of the user's position.

FIG. 1 shows the evolution of home appliances for digital information.

In the 1980's, information was exchanged through a network composed of personal computers (PCs), notebook computers, main frame computers, workstations, etc. This network was used in limited areas such as research institutes, offices, etc.

In the 1990's, the Internet grew gradually. Accordingly, interests in home stations were gradually on the rise, and the Internet which had been used in limited areas such as research institutes, offices, etc., was spread to individuals and homes.

As the 2000's sets in, wireless networks have been developed remarkably and the transmission speed of wire networks has grown abruptly. As a result, circulation of large-capacity multimedia contents as described above has become serious and research on digital broadcastings have been in progress actively. Additionally, some services have already been commercialized. Meanwhile, many home appliances have been changed into information home appliances under the concept of "ubiquitousness". Presently, digital information is transmitted and received through not only computers or workstations but also digital televisions (TVs), portable phones, video phones, smart phones, etc. Additionally, among home appliances such as refrigerators, microwave ovens, air conditioners, etc., digital information can be transmitted and received under the concept of the home network and "ubiquitousness".

FIG. 2 is a view illustrating a conventional home network server and home network appliances.

A user can control a home network appliance 210 or confirm the state of the home network appliance using an appliance that supports a graphic user interface (hereinafter referred to as a "GUI appliance") 230 such as a PC, a digital TV, a home pad, a PDA, etc. In other words, the user can access a home network server 220 using the GUI appliance 230, control the appliance 210 existing on the home network using the GUI transferred from the home network server 220, and confirm the state of the appliance 210.

For reference, the home network server 220 is classified as either an inner home network server or an outer home network server. A home gateway is used as the inner home network server in consideration of even the case in which the Internet is not supported, and a general web server which communicates with the home gateway is used as the outer home network server.

Here, the graphic user interface may be implemented by a hypertext markup language (HTML) web page or a separate application program. The web page type user interface has advantages in that its production, maintenance and repair are easier than those of the application program type user interface.

FIG. 3 is a view illustrating the structure of a conventional product control code.

The conventional GUI appliance 230 that supports the graphic user interface includes a user interface unit 310 and a script unit 320.

The user interface unit 310 provides a graphic user interface to a user, and is generally implemented by HTML. The user interface unit 310 displays the state of the home network appliance 210 using an image or text, or provides means for controlling the home network appliance 210 using an image to the user.

The script unit 320 includes a state receiving unit and an appliance control unit. The state receiving unit receives the state of the home network appliance 210, and the received state of the home network appliance 210 is output to a display screen through the user interface unit 310.

The appliance control unit transmits a control command to the home network appliance 210. The user inputs the control command through the user interface unit 310, and the input control command is transferred to the home network appliance 210 through the appliance control unit.

Generally, in the appliance that supports the graphic user interface (GUI appliance) 230, the state receiving unit and the appliance control unit are made using a java script. Since the java script does not perform hardwired communication with the GUI appliance 230, it plays its role through an ActiveX control object.

In other words, in the web page type graphic user interface, an ActiveX control object that communicates with hardware has been announced, and using this, the ActiveX control object communicates with a control device so that it receives the state information from the home network appliance 210 or transmit the control command to the home network appliance.

In the case in which HTML files that include the graphic user interfaces for the home network appliances 210 having the same resolution are created, as shown in FIG. 3, script codes that correspond to the respective HTML files should be developed according to the resolution of the control device.

This causes redundant work for simply correcting the same code to be done and requires a commitment of expert manpower although such work is simple.

SUMMARY OF THE INVENTION

An aspect of the present invention is to automatically create a control code for a home network appliance according to a control device that supports a different resolution.

Another aspect of the present invention is to make it possible to test a home network appliance using a control code created even in the case in which the home network appliance is not actually bound.

According to an aspect of the present invention, there is provided an apparatus for creating a control code for a home network appliance according to the resolution of a control device, according to an exemplary embodiment of the present invention, which comprises a first receiving unit that receives a first HTML file that provides a graphic user interface composed of fragmented images, a resource management unit that creates a pseudo code that defines a matching relation between an image identifier (ID) of the fragmented image that constitutes the received first HTML file and a behavior function for controlling the home network appliance or collecting a state of the home network appliance, a user interface (UI) code creating unit that creates a second HTML file on which the matching relation is reflected with reference to the created pseudo code, and a script code creating unit that creates a script code that is called by the second HTML file to control the home network appliance or collect the state of the home network appliance.

According to another exemplary embodiment of the present invention, there is provided a method for creating a control code for a home network appliance according to resolution of a control device, which comprises the steps of receiving a first HTML file that provides a graphic user interface composed of fragmented images, creating a pseudo code that defines a matching relation between an image ID of the fragmented image that constitutes the received first HTML file and a behavior function for controlling the home network appliance or collecting a state of the home network appliance, creating a second HTML file on which the matching relation is reflected with reference to the created pseudo code and creating a script code that is called by the second HTML file to control the home network appliance or collect the state of the home network appliance.

BRIEF DESCRIPTION OF THE DRAWINGS

The above and other aspects of the present invention will be more apparent from the following detailed description of exemplary embodiments taken in conjunction with the accompanying drawings, in which.

DETAILED DESCRIPTION OF THE EXEMPLARY EMBODIMENTS

Figure 1:
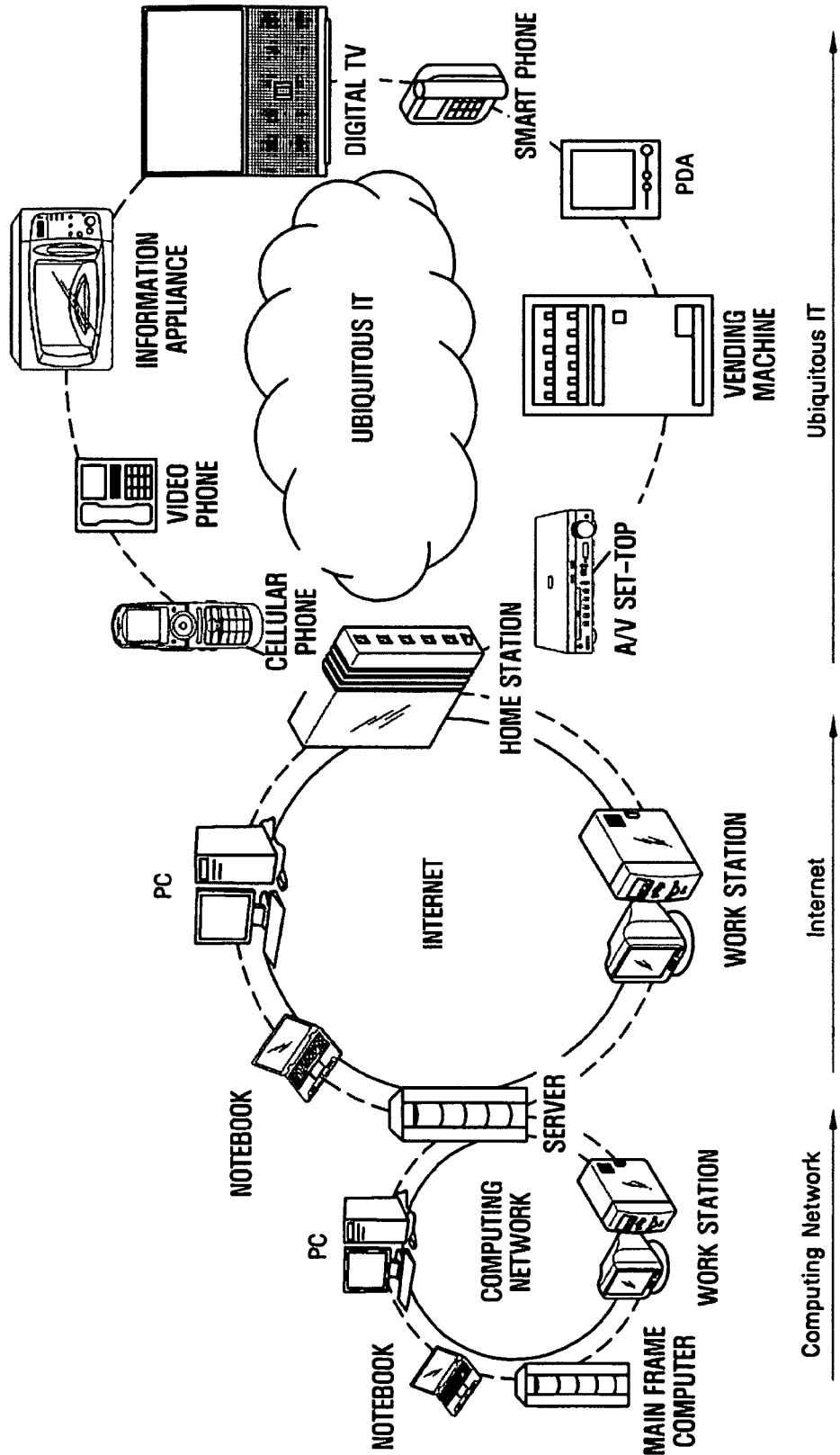
FIG. 1 is a view illustrating the evolution of home appliances for digital information.
Figure 2:
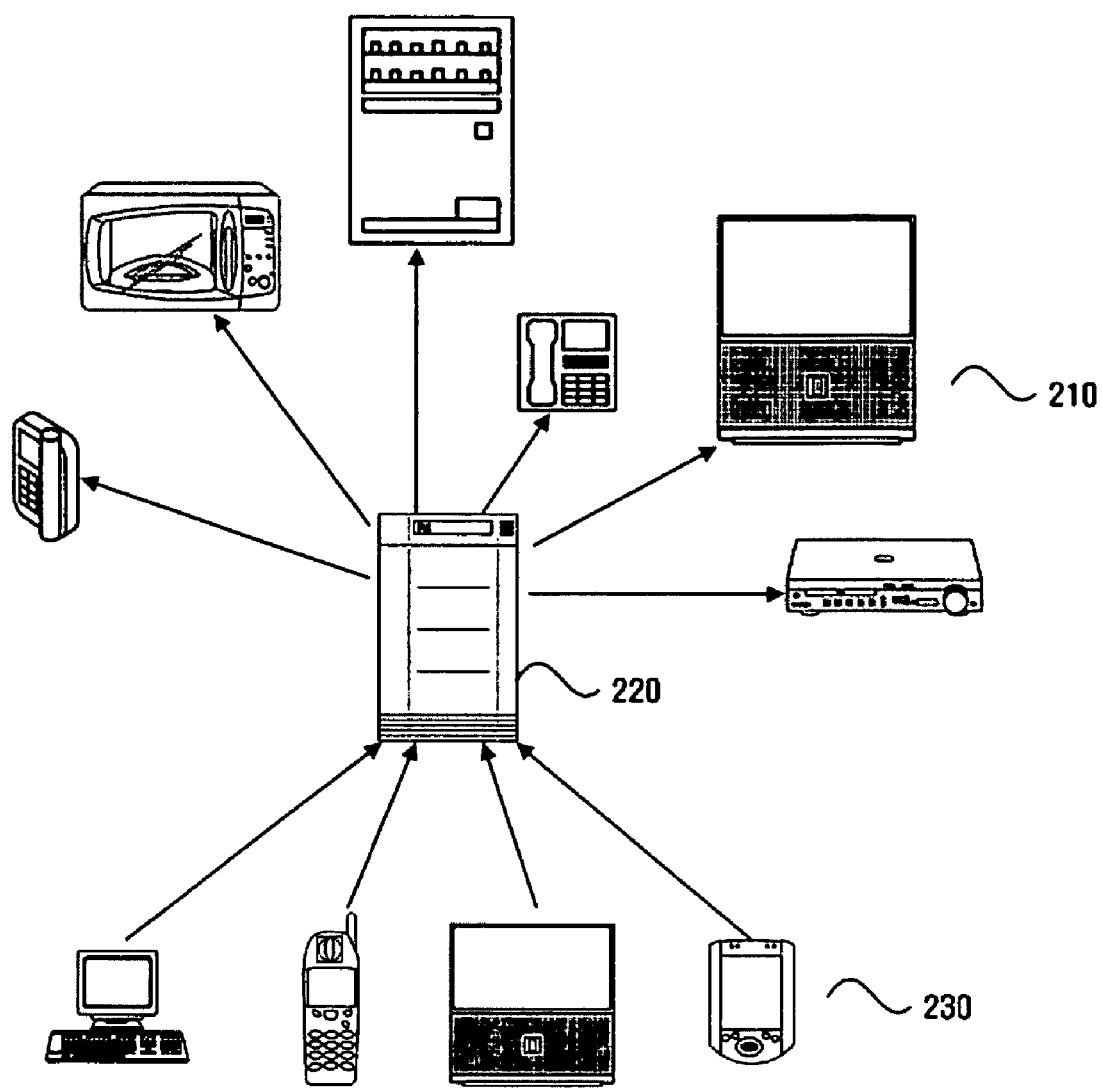
FIG. 2 is a view illustrating a conventional home network server and home network appliances.
Figure 3:
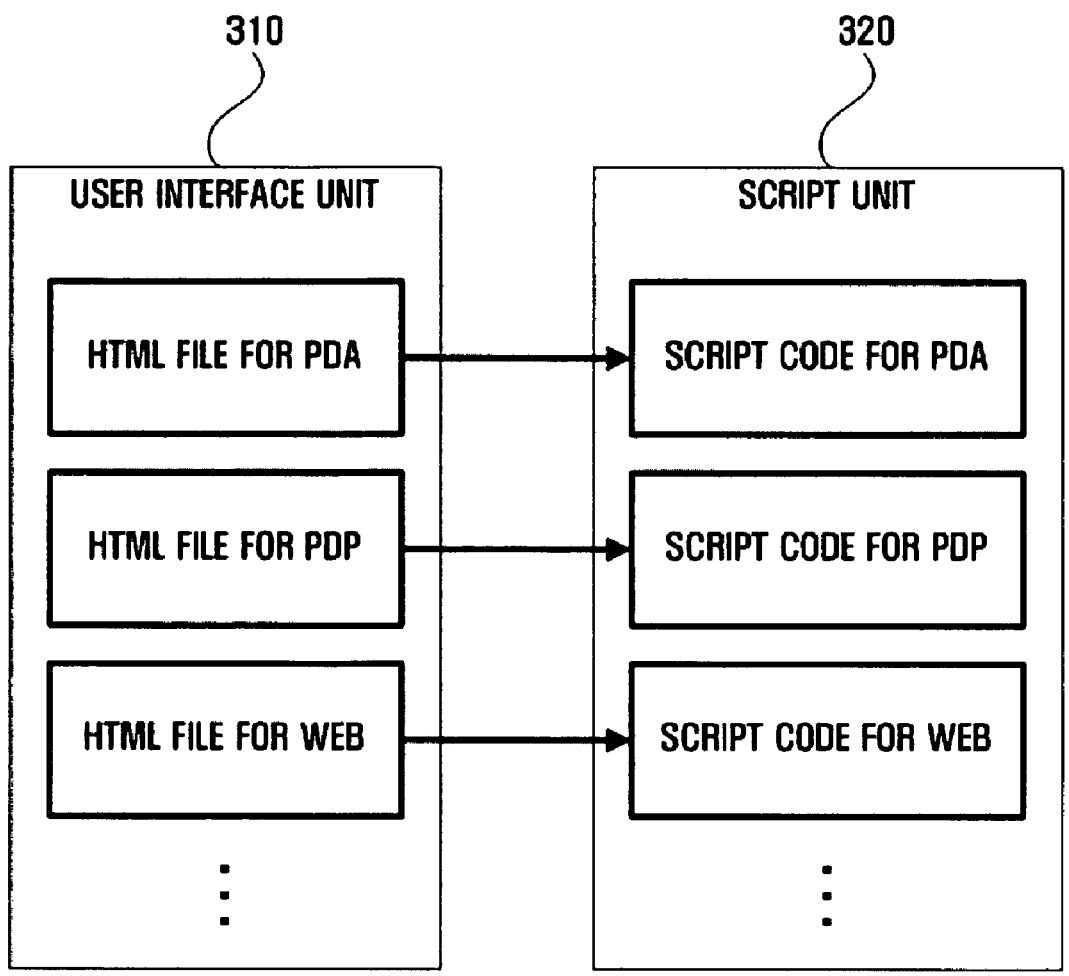
FIG. 3 is a view illustrating the structure of a conventional product control code.

Hereinafter, exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings. However, the present invention is not limited to the exemplary embodiments disclosed hereinafter, but will be implemented in diverse forms. The matters defined in the description, such as detailed construction and elements, are nothing but specific details provided to assist those ordinary skilled in the art in a comprehensive understanding of the invention, and the present invention is only defined within the scope of appended claims. In the whole description of the present invention, the same drawing reference numerals are used for the same elements among/across various figures.

Figure 4:
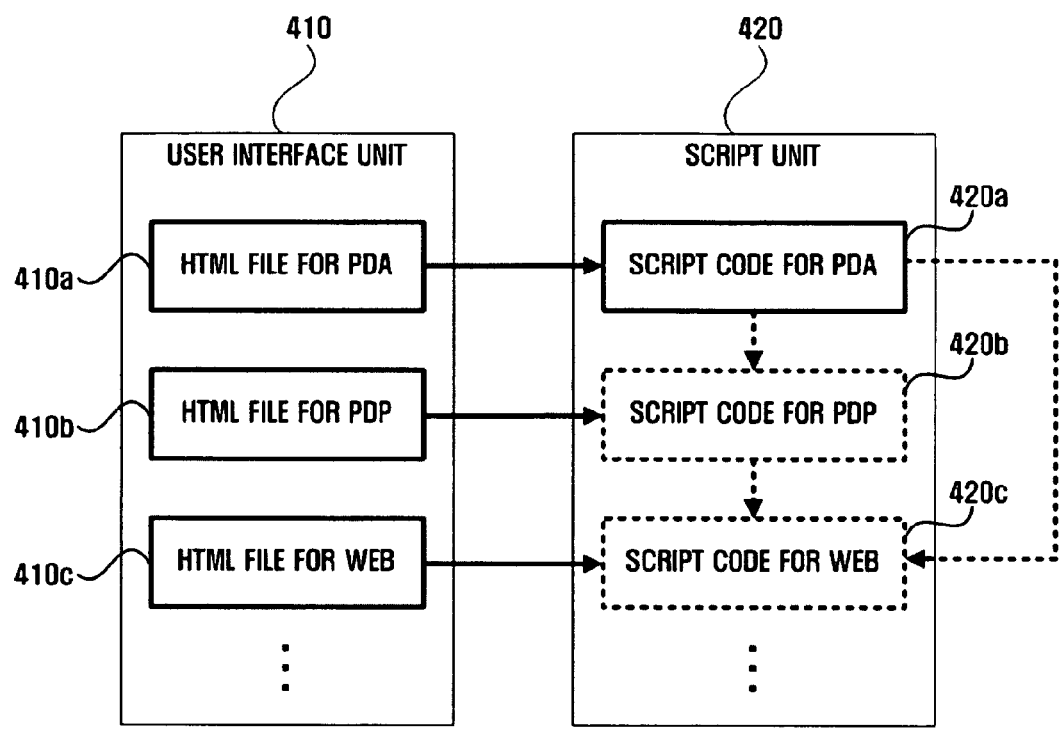
FIG. 4 is a view illustrating the structure of a product control code according to an exemplary embodiment of the present invention.

FIG. 4 is a view illustrating the structure of a product control code according to an exemplary embodiment of the present invention.

An apparatus for supporting a graphic user interface according to an exemplary embodiment of the present invention includes a user interface unit 410 and a script unit 420.

The user interface unit 410 provides a graphic user interface to a user, and is generally implemented by HTML. The user interface unit 410 displays the state of the home network appliance 210 using an image or text, or provides means for controlling the home network appliance 210 using an image to the user.

The script unit 420 includes a state receiving unit and an appliance control unit. The state receiving unit receives the state of the home network appliance 210, and the received state of the home network appliance 210 is output to a display screen through the user interface unit 410.

The appliance control unit transmits a control command to the home network appliance 210. The user inputs the control command through the user interface unit 410, and the input control command is transferred to the home network appliance 210 through the appliance control unit.

Generally, in the appliance that supports the graphic user interface (GUI appliance), the state receiving unit and the appliance control unit are made using java scripts. Since the java script does not perform hardwired communication with the GUI appliance, it plays its role through an ActiveX control object. In other words, in the web page type graphic user interface, an ActiveX control object that communicates with hardware has already been announced, and using this, the ActiveX control object communicates with a control device so that it receives the state information from the home network appliance 210 or transmits the control command to the home network appliance.

Conventionally, in order to develop the control code for the home network appliance 210 according to the resolution of the control device to control the home network appliance 210 or to collect the state of the home network appliance 210, script codes 420a, 420b and 420c that correspond to HTML files 410a, 410b and 410c should be developed separately. By contrast, according to the present invention, the script code 420b or 420c of the control device for the same home network appliance is created using the first created script 420a.

For example, in the case in which the resolution of the first control device to control a washing machine that is a home network appliance or to collect the state of the washing machine is 1024×768 and its script code 420a exists, the script code 420b or 420c of the second control device having a resolution of 320×240 is created using the script code 420a of the first control device.

Figure 5:
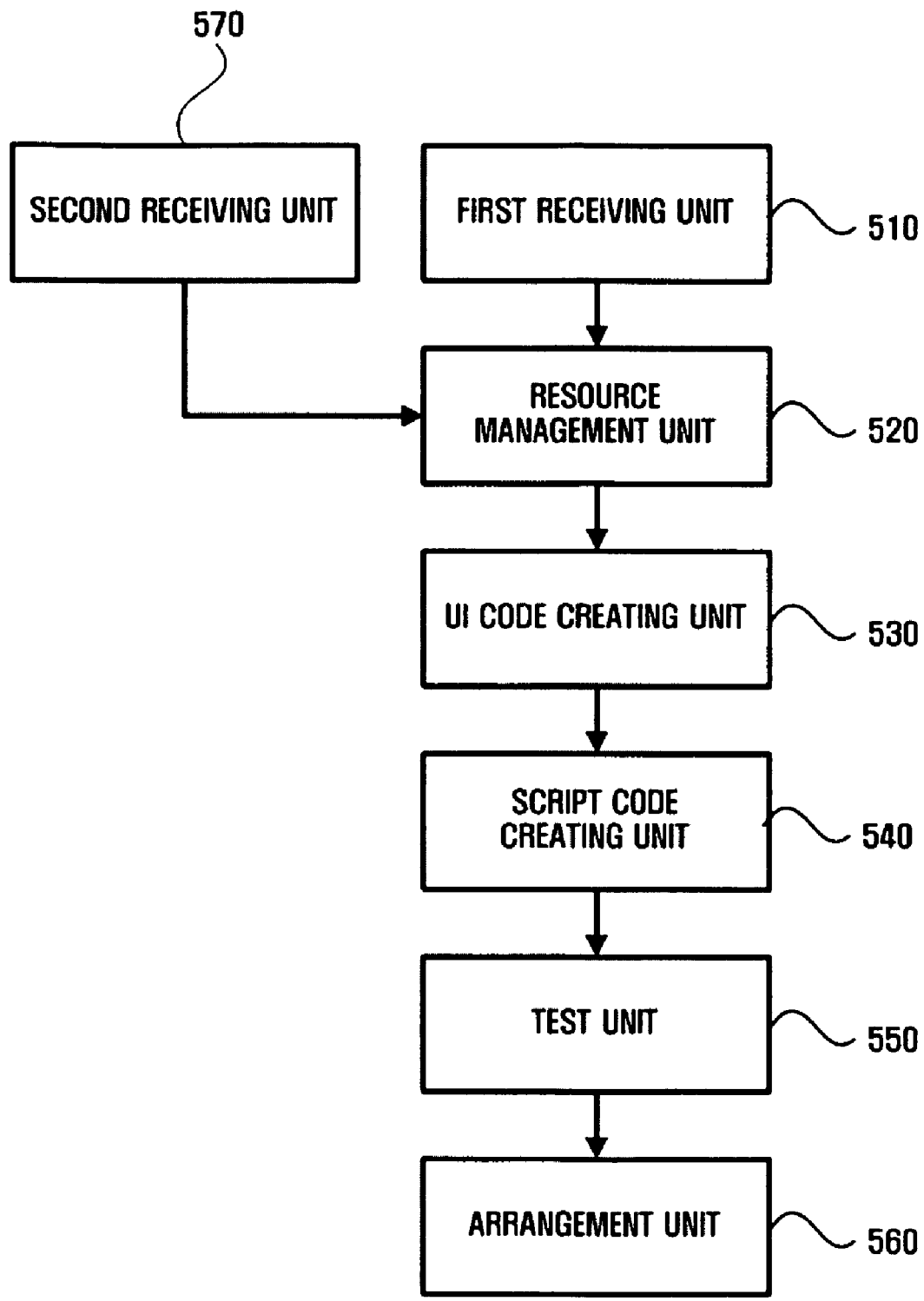
FIG. 5 is a block diagram illustrating the construction of an apparatus for creating a control code for a home network appliance according to the resolution of a control device according to an exemplary embodiment of the present invention.

FIG. 5 is a block diagram illustrating the construction of an apparatus for creating a control code for a home network appliance according to the resolution of a control device according to an exemplary embodiment of the present invention.

Referring to FIG. 5, the apparatus for creating a control code for a home network appliance 210 includes a first receiving unit 510, a second receiving unit 570, a resource management unit 520, and a UI code creating unit 530, a script code creating unit 540, a test unit 550 and an arrangement unit 560.

The first receiving unit 510 receives a first HTML file that provides a graphic user interface composed of fragmented images.

Here, the first HTML file may be a file that includes the graphic user interface for the home network appliance 210, the graphic user interface is composed of the fragmented images according to the control or the state collection of the home network appliance 210.

For reference, the first HTML file is an incomplete file to which the function to control the home network appliance 210 or to collect the state of the home network appliance 210 is not connected.

The second receiving unit 570 receives an image ID, a behavior function that matches the image ID and a condition of the behavior function.

The apparatus to control the home network appliance 210 or to collect the state of the home network appliance 210 uses the graphic user interface that is familiar with the user, and the images that constitute the graphic user interface are generally in the form of fragments. Additionally, the user may transfer a control command to the home network appliance 210 by selecting the fragmented image using a selector or a short-cut key, and transfer the state of the home network appliance 210 to the user using a method to substitute the image of the fragmented part by another image and so on.

Accordingly, a developer may connect a control behavior function or a state collection behavior function to the respective fragmented image. For this, the image ID is assigned to the respective image and the behavior function for the image ID is determined. Additionally, in order to prepare a pseudo code for the behavior function, the condition of the behavior function set for the image ID is input, and the second receiving unit 570 receives the image ID, the behavior function that matches the image ID and the condition of the behavior function.

The resource management unit 520 creates a pseudo code that defines a matching relation between the image ID of an image that constitutes the first HTML file transferred from the first receiving unit 510 and a behavior function to control the home network appliance 210 or to collect the state of the home network appliance 210.

Here, the pseudo code may be prepared in the form of an extensible markup language (XML) code. Accordingly, the developer may store the pseudo code prepared in the form of an XML code, and then apply a pseudo code stored in the first HTML file of another control device having a different resolution as it is or apply the pseudo code after correcting it.

The UI code creating unit 530 creates the second HTML file on which the matching relation is reflected with reference to the pseudo code created by the resource management unit 520.

As described above, the pseudo code defines the matching relation between the image ID and the behavior function, and the UI code creating unit 530 creates the second HTML file according to the matching relation defined in the pseudo code. Accordingly, the second HTML file is a file to which the function to control the home network appliance 210 or to collect the state of the home network appliance 210 is connected.

The script code creating unit 540 creates a script code that is called by the second HTML file to control the home network appliance 210 or to collect the state of the home network appliance 210.

The script code creating unit 540 creates the script code with reference to the image ID received by the second receiving unit 570, the behavior function that matches the image ID, the condition of the behavior function and a specified pre-stored table.

The script code is called by the second HTML file, and may control the home network appliance 210 or collect the state of the home network appliance 210.

A java script may be used as the script code. The java script communicates with the ActiveX control object installed in the control device and makes the control device control the home network appliance 210 or collect the state of the home network appliance 210.

For reference, the script code may be stored in the form of an XML to be reused. The stored XML script code may be referred to by the script code creating unit 540 and then may be used to create another script code according to the resolution of the control device.

The test unit 550 performs the test of the control or the state collection of a specified home network appliance 210 that is not actually bound to the control device using the created second HTML file and the script code.

The test unit 550 includes a test environment setting unit, a test log management unit and a test result display unit. If the developer sets a home network server for development through the test environment setting unit, the result of the control or the state collection of the target home network appliance 210 is displayed in real time through the test result display unit and even a control packet transferred to the home network appliance 210 is confirmed. The result displayed on the test result display unit is stored in the test log management unit to be confirmed by the developer later.

The arrangement unit 560 arranges at least one of the second HTML file and the script code of which the test has been completed through the test unit 550 in the home network server.

The arrangement unit 560 includes an arrangement environment setting unit, an arrangement result display unit and an arrangement log management unit. The developer can set the home network server in which the control code will be arranged through the arrangement environment setting unit.

Accordingly, the total number of arranged files, arrangement success/fail, etc., are displayed through the arrangement result display unit and then stored in the arrangement log management unit to be confirmed by the developer.

Figure 6:
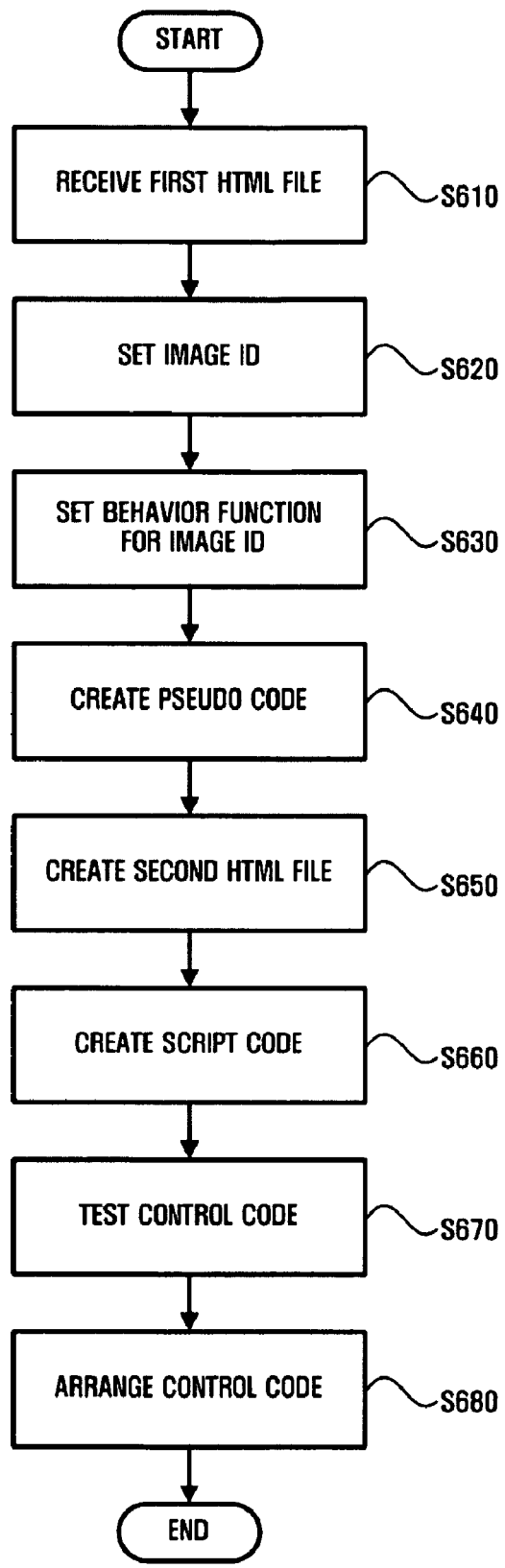
FIG. 6 is a flowchart illustrating a process of creating a control code for a home network appliance according to the resolution of a control device according to an exemplary embodiment of the present invention.

FIG. 6 is a flowchart illustrating a process of creating a control code for a home network appliance according to the resolution of a control device according to an exemplary embodiment of the present invention.

The control device receives the first HTML file of which the image ID has not yet been set through the first receiving unit 510 (S610).

As described above, the first HTML file is an incomplete file to which the function to control the home network appliance 210 or to collect the state of the home network appliance 210 is not connected.

Then, the control device receives the image ID that is the ID of the fragmented image of the graphic user interface of the home network appliance 210 through the second receiving unit 570 (S620), and receives the behavior function that matches the received image ID and the condition of the behavior function (S630).

Accordingly, the resource management unit 520 creates the pseudo code that defines the matching relation between the image ID and the behavior function using the first HTML file transferred from the first receiving unit 510, the image ID transferred from the second receiving unit 570, the behavior function matching the image ID and the condition of the behavior function (S640).

The UI code creating unit 530 creates the second HTML file on which the matching relation is reflected with reference to the pseudo code created by the resource management unit 520 (S650). In other words, the UI code creating unit 530 creates the second HTML file that includes the image ID matching the behavior function.

The script code creating unit 540 creates the script code with reference to the image ID received by the second receiving unit 570, the behavior function that matches the image ID and the condition of the behavior function (S660).

Here, the script code may be stored in the form of an XML and reused. The script code stored in the form of an XML may be referred to by the script code creating unit 540 and used to create another script code according to the resolution of the control device.

The created second HTML file and script code constitute the control code to be transferred to the test unit 550, and the test unit 550 performs the test of the control or the state collection of a specified home network appliance using the control code (S670).

In this respect, the test unit 550 may perform the test of the control or the state collection of a specified home network appliance 210 that is not actually bound to the control device. If the developer sets the home network server for development, the result of the control or the state collection of the target home network appliance 210 is displayed in real time and even the control packet transferred to the home network appliance 210 is confirmed. The displayed result is stored as a log file to be confirmed by the developer later.

The control code of which the test has been completed by the test unit 550 is arranged in the home network server by the arrangement unit 560. The arrangement unit 560 may selectively arrange the control code, i.e., one or all of the second HTML file and the script code, to the home network server.

The developer can arrange the control code to the home network server by setting the home network server to which the control code is to be arranged, the control code to be arranged, etc.

As described above, the apparatus and method for creating a control code for a home network appliance according to resolution of a control device according to the present invention has one or more of the following effects.

First, a control code for a home network appliance according to a control device that supports a different resolution is automatically created, and thus unnecessary repeated work to simply correct the same code is reduced.

Second, the test of a home network appliance is performed using the automatically created control code even in the case in which the home network appliance is not actually bound, and this facilitates the test.

Although exemplary embodiments of the present invention have been described with reference to the accompanying drawings, those skilled in the art will appreciate that various modifications can be made to the disclosed exemplary embodiments without substantially departing from the principles of the present invention, Therefore, the disclosed exemplary embodiments of the present invention are used in a generic and descriptive sense only and not for purposes of limitation.

What is claimed is:

1. A method for creating a control code for a network appliance according to resolution of a control device, the method comprising:
    receiving, by a first receiving unit, a first hypertext markup language (HTML) file that provides a graphic user interface composed of a fragmented image;
    creating by a resource management unit, a pseudo code that defines a matching relation between an image identifier (ID) of the fragmented image that constitutes the first HTML file and a behavior function for controlling the network appliance or collecting a state of the network appliance;
    creating, by a user interface (UI) code creating unit, a second HTML file on which the matching relation is reflected with reference to the pseudo code; and
    creating, by a script code creating unit, a script code that is called by the second HTML file to control the network appliance or collect the state of the network appliance,
    wherein the second HTML file is created by applying the pseudo code to the first HTML file having a different resolution.

2. The method as claimed in claim 1, wherein the script code is called by the second HTML file to be reused.

3. The method as claimed in claim 1, wherein the pseudo code is an extensible markup language (XML) code.

4. The method as claimed in claim 1, further comprising receiving the image ID, a behavior function matching the image ID and a condition of the behavior function.

5. The method as claimed in claim 1, further comprising performing a test of the control or the state collection of a specified network appliance that is not bound using the second HTML file and the script code.

6. The method as claimed in claim 5, further comprising arranging at least one of the second HTML file and the script code in a network server.

7. An apparatus for creating a control code for a network appliance according to a resolution of a control device, the apparatus comprising:
    a first receiving unit which receives a first hypertext markup language (HTML) file that provides a graphic user interface composed of a fragmented image;
    a resource management unit which creates a pseudo code that defines a matching relation between an image identifier (ID) of the fragmented image that constitutes the first HTML file and a behavior function for controlling the network appliance or collecting a state of the network appliance;
    a user interface (UI) code creating unit which creates a second HTML file on which the matching relation is reflected with reference to the pseudo code; and
    a script code creating unit which creates a script code that is called by the second HTML file to control the network appliance or collect the state of the network appliance, wherein the UI code creating unit creates the second HTML file by applying the pseudo code to the first HTML file having a different resolution, wherein at least one of the first receiving unit, the resource management unit, the UI code creating unit, and the script code creating unit is implemented by hardware.

8. The apparatus as claimed in claim 1, wherein the script code is called by the second HTML file to be reused.

9. The apparatus as claimed in claim 1, wherein the pseudo code is an extensible markup language (XML) code.

10. The apparatus as claimed in claim 1, further comprising a second receiving unit which receives the image ID, a behavior function matching the image ID and a condition of the behavior function.

11. The apparatus as claimed in claim 10, wherein the script code creating unit creates the script code with reference to the received image ID, the received behavior function matching the image ID, and the received condition of the behavior function.

12. The apparatus as claimed in claim 1, further comprising a test unit which performs a test of the control or the state collection of a specified network appliance that is not bound using the second HTML file and the script code.

13. The apparatus as claimed in claim 12, further comprising an arrangement unit which arranges at least one of the second HTML file which is tested and the script code in a network server.

14. The apparatus as claimed in claim 1, wherein the received first HTML file is an incomplete HTML file to which the behavior function is not connected.

15. The apparatus as claimed in claim 1, wherein the network appliance is an external network appliance distinct from the apparatus.

* * * * *